(12) United States Patent
Tien et al.

(10) Patent No.: US 9,542,671 B2
(45) Date of Patent: Jan. 10, 2017

(54) METHOD AND SYSTEM TO FACILITATE SECURELY PROCESSING A PAYMENT FOR AN ONLINE TRANSACTION

(75) Inventors: Alan Tien, Los Gatos, CA (US); Peter Zhe Chu, Mountain View, CA (US); Ray Hideki Tanaka, Sunnyvale, CA (US); Steve S. Chen, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 990 days.

(21) Appl. No.: 10/844,863

(22) Filed: May 12, 2004

(65) Prior Publication Data
US 2005/0256806 A1    Nov. 17, 2005

(51) Int. Cl.
| | |
|---|---|
| *G06Q 20/00* | (2012.01) |
| *G06Q 20/04* | (2012.01) |
| *G06Q 20/12* | (2012.01) |
| *G06Q 20/38* | (2012.01) |
| *G06Q 30/06* | (2012.01) |

(52) U.S. Cl.
CPC ........... *G06Q 20/04* (2013.01); *G06Q 20/12* (2013.01); *G06Q 20/382* (2013.01); *G06Q 20/3823* (2013.01); *G06Q 30/06* (2013.01)

(58) Field of Classification Search
CPC .................................................. G06Q 20/401
USPC .......... 705/1, 18, 26, 39, 76, 27, 64, 50, 75, 67,705/71, FOR. 124; 380/255, FOR. 104; 902/1, 2
See application file for complete search history.

(56) References Cited

U.S. PATENT DOCUMENTS

| | | | |
|---|---|---|---|
| 5,757,917 A * | 5/1998 | Rose ...................... | G06Q 20/02 705/39 |
| 5,778,178 A | 7/1998 | Arunachalam | |
| 5,987,500 A | 11/1999 | Arunachalam | |
| 6,000,832 A * | 12/1999 | Franklin ................. | G06Q 20/02 235/379 |
| 6,058,373 A * | 5/2000 | Blinn et al. ..................... | 705/26 |
| 6,138,107 A | 10/2000 | Elgamal | |
| 6,212,556 B1 | 4/2001 | Arunachalam | |
| 6,246,996 B1 * | 6/2001 | Stein ...................... | G06Q 10/00 705/26.43 |
| 6,317,745 B1 | 11/2001 | Thomas et al. | |

(Continued)

FOREIGN PATENT DOCUMENTS

WO    WO-2005114899 A2    12/2005

*Primary Examiner* — Charles C Agwumezie
(74) *Attorney, Agent, or Firm* — Maschoff Brennan

(57) ABSTRACT

A computer-implemented method, to facilitate processing a payment for an online transaction, includes, responsive to receiving secure transaction data from a merchant server, using a payment processor to generate a transaction data identifier to identify the transaction data. The payment processor communicates the transaction data identifier to the merchant server. In response to receiving a request to process a payment, including the transaction data identifier, the payment processor requests user credentials from a user. Upon receiving user credentials from the user, the payment processor verifies the user credentials. The payment processor processes the payment and generates a payment identifier to identify payment data associated with the payment. The payment processor communicates the payment identifier to the merchant server. Upon receiving a request for payment data, including the payment identifier, over a secure communication channel from the merchant server, the payment processor communicates the payment data to the merchant server.

16 Claims, 7 Drawing Sheets

(56) References Cited

U.S. PATENT DOCUMENTS

| | | | | |
|---|---|---|---|---|
| 6,327,578 | B1 * | 12/2001 | Linehan | G06Q 20/02 |
| | | | | 705/65 |
| 6,449,599 | B1 * | 9/2002 | Payne | G06Q 10/087 |
| | | | | 705/26.8 |
| 6,675,153 | B1 * | 1/2004 | Cook | G06Q 20/02 |
| | | | | 705/64 |
| 6,889,325 | B1 * | 5/2005 | Sipman | G06Q 20/04 |
| | | | | 380/268 |
| 7,107,249 | B2 * | 9/2006 | Dively | G06Q 20/02 |
| | | | | 235/375 |
| 2002/0016765 | A1 * | 2/2002 | Sacks | G06Q 20/02 |
| | | | | 705/39 |
| 2002/0072942 | A1 | 6/2002 | Kuykendall et al. | |
| 2002/0099656 | A1 | 7/2002 | Wong | |
| 2003/0055781 | A1 * | 3/2003 | Ong | G06Q 20/02 |
| | | | | 705/39 |
| 2004/0039692 | A1 * | 2/2004 | Shields | G06Q 20/04 |
| | | | | 705/39 |
| 2004/0111368 | A1 * | 6/2004 | Cuthbertson | G06Q 20/02 |
| | | | | 705/40 |
| 2005/0004876 | A1 * | 1/2005 | Movalli | G06Q 20/04 |
| | | | | 705/64 |

* cited by examiner

METHOD AND SYSTEM TO FACILITATE SECURELY PROCESSING A PAYMENT FOR AN ONLINE TRANSACTION

FIELD OF THE INVENTION

The present invention relates generally to the field of commerce automation. More specifically, the present invention relates to a method and system to facilitate securely processing payments for online transactions.

BACKGROUND OF THE INVENTION

Electronic commerce ("e-commerce") has been increasing in popularity as more people are becoming accustomed to purchasing products online via the Internet. However, online transactions can raise security issues for merchants.

In a typical e-commerce transaction, a customer uses a web client (e.g., a browser, such as the Internet Explorer browser developed by Microsoft Corporation of Redmond, Wash. State) to access a merchant website hosted on a merchant server. The customer browses the merchant website selecting items to purchase. When the customer is ready to pay for the selected items, a checkout web page including a list of the items selected for purchase is displayed. To confirm the selection of items, the user selects a "checkout" button on the checkout web page.

Next, a payment web page is displayed to the customer. At the payment web page, the customer enters payment information for the e-commerce transaction. For example, the customer may be prompted to enter a credit card number, a billing address for the credit card number, and a shipping address for the items selected for purchase. Once the information is entered, the customer selects a "submit payment" button and the payment information is posted to the merchant server. The merchant server will then communicate the payment information to a server administered by a third party payment processor. The payment processor server will verify the information entered by the customer, process the payment, and communicate to the merchant server whether the payment was successful. Upon a successful payment, the merchant server will display a payment verification web page to the user.

An alternative method is commonly referred to as a "buyer push" payment method, in which the seller "pushes" funds to the merchant. A "buyer push" transaction may proceed as follows.

At a checkout web page downloaded to the customer's computer, the customer is presented with a virtual shopping cart listing all of the items the customer has selected to purchase. In addition, the checkout web page may list other transaction data, such as the price for each item, a sub-total for all items, any applicable tax, and a total cost of the transaction. When the customer selects the "checkout" button, the customer's computer communicates all of the transaction information to a third party server for payment processing via a Hypertext Transfer Protocol (HTTP) Post method.

The payment processor server receives the transaction information and then presents the user with a user credentials web page. The user credentials web page prompts the customer to enter a username and password for verification purposes. Once the customer enters a username and password, the customer selects the "OK" button to submit the user credentials to the payment processor server.

Upon successful verification, the customer is presented with a payment web page. At the payment web page, the customer selects a form of payment that is available to the customer based on the customer's user credentials and the customer's current account standings with the payment processor. For customers with existing accounts, a previously selected default shipping address is used. However, the customer might select an alternative shipping address at the payment web page. After entering the payment information, the customer selects the "submit payment" button to confirm the payment and to communicate the payment information to the third party payment processor server.

After receiving and validating the payment information, the payment processor server displays a payment confirmation web page and communicates the payment information to the merchant server with a payment status (e.g., whether the payment was successful). If the payment status indicates that the payment was successful, then the merchant server will display its own payment confirmation web page.

The "buyer push" method described has potential technical problems that can raise security concerns for merchants. In the traditional "buyer push" scheme described above, when the transaction information is communicated from the merchant checkout page to the third party payment processor, the transaction information is susceptible to being intercepted and/or modified. For example, the transaction information is simply embedded in a hypertext markup language (HTML) document and communicated to the third party payment processor server via the Hypertext Transfer Protocol (HTTP) Post method. Therefore, the transaction information can be viewed and edited by simply editing the source HTML document prior to submitting the data to the third party payment processor server. A customer might modify the payment price and pay less for a product than the merchant intended. Similarly, the status of the payment is communicated to the merchant server via the HTTP Post method and therefore subject to the same security issues. Consequently, security flaws exist in the traditional "buyer push" method.

SUMMARY OF THE INVENTION

In accordance with one aspect of the present invention, there is provided a computer-implemented method and system to facilitate the processing of payments for e-commerce transactions. A merchant server encrypts and digitally signs transaction data (e.g., items selected by a customer for purchase, the price of the items, any applicable sales tax, and/or shipping and handling charges) and communicates the transaction data to a third party payment processor server. Upon receiving secure transaction data from a merchant server, the payment processor server decrypts and authenticates the transaction data and generates a transaction data ID to identify the transaction data. Next, the payment processor server digitally signs and communicates the transaction data ID to the merchant server. After receiving and authenticating the transaction data ID, the merchant server digitally signs and communicates a request to process a payment to the payment processor server. The request to process the payment includes the transaction data ID to identify the transaction and related transaction data for which the merchant server would like the payment processed. The payment processor server receives and authenticates the request to process the payment and prompts the customer to enter user credentials to verify the identity of the customer and access the customer's previously stored account data. Once the customer's credentials have been verified, the payment processor automatically processes the payment by directing the customer's funds to the merchant's account.

In accordance with a second aspect of the invention, after a payment is processed, the payment processor server generates a secure payment ID to identify payment data related to the transaction payment. The payment processor server digitally signs and communicates the secure payment ID to the merchant server. Next, the merchant server digitally signs and communicates a request for payment data, such as payment status, to the payment processor server. The request for payment data includes the secure payment ID to identify the payment data being requested. The payment processor server receives and authenticates the request for payment data and subsequently communicates the payment data to the merchant server over a secure communication channel. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A computer-implemented method and a system to process a payment for an e-commerce transaction are described. In the following description, for purposes of explanation, numerous specific details are set forth in order to provide a thorough understanding of the present invention. It will be evident, however, to one skilled in the art that the present invention may be practiced without these specific details.

Figure 1:
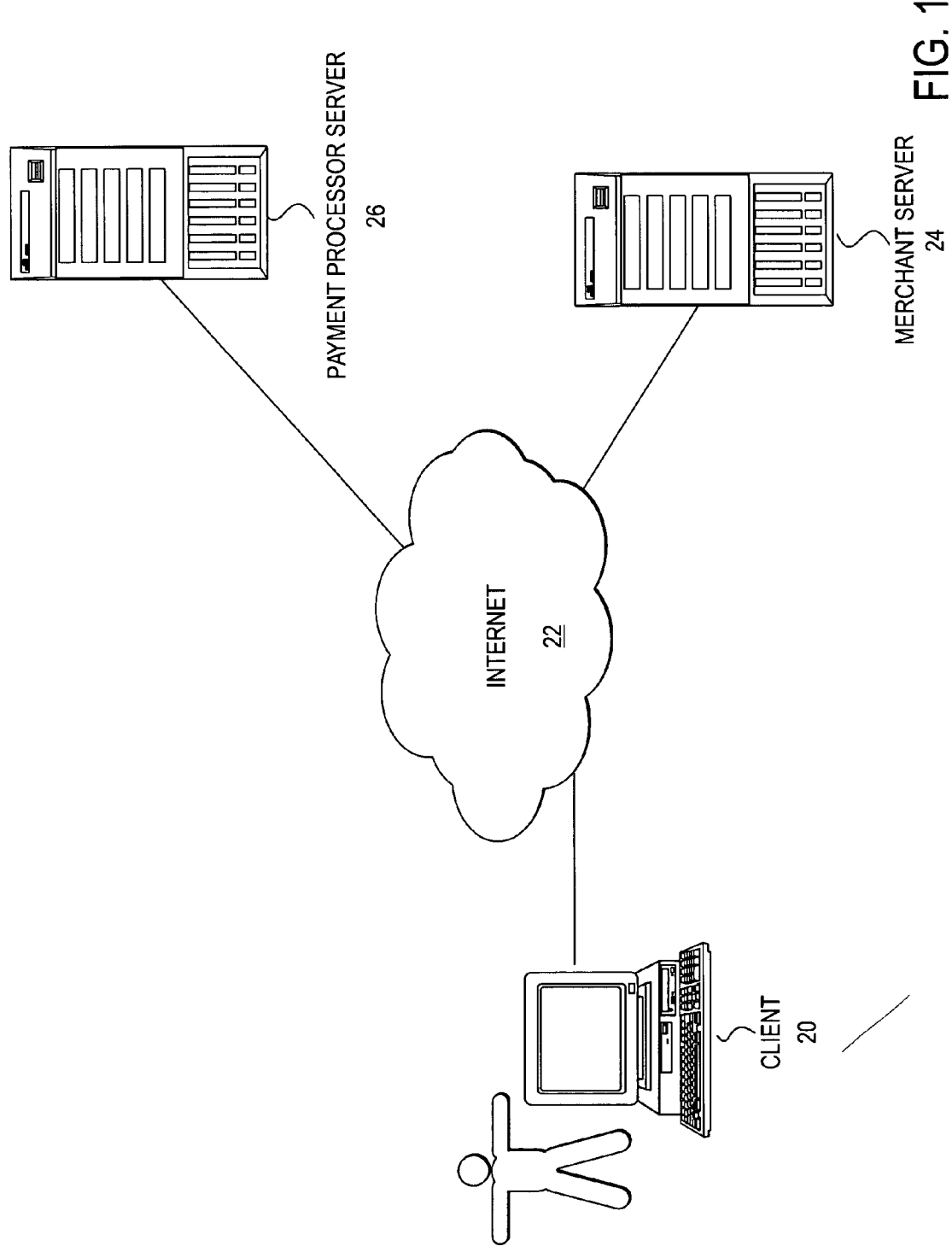
FIG. 1 is an exemplary client-server network diagram illustrating the relationship between a client PC, a merchant server and a payment processor server, for one embodiment of the present invention.

FIG. 1 illustrates an exemplary client-server network environment in which the present invention can be implemented. In accordance with one embodiment of the present invention, and as illustrated in FIG. 1, a potential customer, or buyer, uses a client personal computer (PC) 20 connected to a network (e.g., the Internet 22) to interact with a merchant server 24 and a payment processor server 26. The client PC 20 will generally execute client software such as a web client (e.g., a browser, such as the Internet Explorer browser developed by Microsoft Corporation of Redmond, Wash. State) that enables the customer to browse web pages on the World Wide Web. In FIG. 1, the client 20 is illustrated as a PC. However, it will be appreciated that the client 20 could be any type of computing device including, but not limited to, a laptop, a handheld digital assistant, or a mobile phone.

The merchant of server 24 executes Internet server software including, but not limited to, web server software and Application Program Interface (API) server software. The web server software executing on merchant server 24 serves web pages to web clients, such as a web browser executing on client 20. The web pages provide an interface to a virtual store that customers can browse with the web browser software. While browsing the virtual store, customers can select items to purchase. Items selected for purchase are temporarily stored by the merchant server 24 and accessed for checkout by selecting a link to a virtual shopping cart. For one embodiment of the present invention, to process a payment for the customer's selected items, the merchant server 24 interacts with the payment processor server 26. Similarly, the API server software provides a programmatic interface to the merchant server 24.

The payment processor server 26 is connected to the client PC 20 and the merchant server 24 via the Internet 22. Like the merchant server 24, the payment processor server 26 also executes Internet server software including, but not limited to, web server software. For one embodiment of the invention, a customer directs a web browser to the website hosted by the payment processor server 26 by entering the uniform resource locator (URL) of the payment processor server 26 (e.g., http://www.xyz-paymentprocessor.com). The payment processor server 26 prompts the customer to create an account, including a username and password to identify the customer as the holder of the account. In addition, the payment processor server 26 might prompt the customer to enter account information for accounts held at other financial institutions, such as bank accounts and credit card accounts. As will be discussed below, by establishing an account with the payment processor, the customer can later use the account to make a payment for items selected for purchase on the virtual store hosted by the merchant server 24.

For one embodiment of the present invention, the customer will have already created an account with the payment processor at the time the customer decides to enter into a transaction via merchant server 24. However, in an alternative embodiment, a customer will be directed to the payment processor website to create an account at or near the time the customer enters into the transaction.

Figure 2:
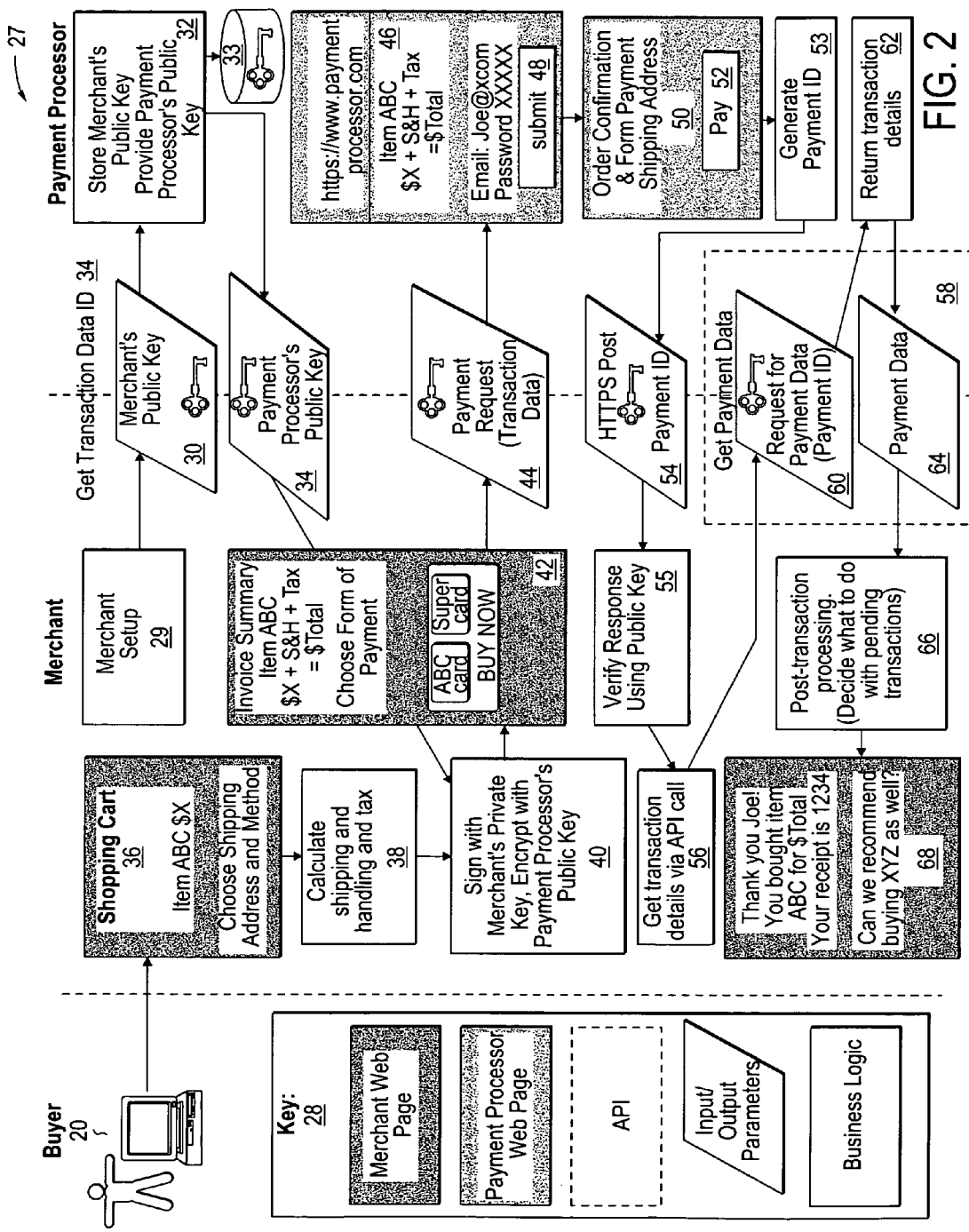
FIG. 2 illustrates a method of processing a transaction payment for an e-commerce transaction from the perspective of a user, for one embodiment of the present invention.

FIG. 2 illustrates a method 27 of processing a transaction payment for an e-commerce transaction from the perspective of a customer, for one embodiment of the present invention. In accordance with the method illustrated in FIG. 2, prior to executing any transactions, the merchant and the payment processor make preparations by exchanging public keys. In particular, merchant server 24 performs a setup operation 29 by communicating the merchant server's public key 30 of a public-private key pair to the payment processor server 26. The payment processor server 26 receives the merchant server's public key 32 and stores it in a merchant public key database 33. For one embodiment of the invention, the payment processor server 26 will receive and store a unique public key for each merchant with whom the payment processor is setup to process payments. In addition, the payment processor server 26 communicates its public key 34 to the merchant server 24. Once the servers have exchanged public keys, the servers are ready to process transactions.

In accordance with one embodiment of the present invention, a customer, or buyer, uses a web client 20 to browse a virtual store hosted on merchant server 24. Once the customer has selected a number of items for purchase, the customer is presented by the merchant server with a preliminary checkout web page 36. The preliminary checkout web page 36 displays the contents of the customer's virtual shopping cart, including a listing of the items selected for purchase by the customer, as well as the prices of each item. In addition, for one embodiment of the invention, the preliminary checkout web page 36 prompts the customer to select a shipping address and shipping method (e.g., overnight or two day air shipping) for the items. After the customer has entered a shipping address and chosen a shipping method, the customer selects a web button or link to a checkout web page 42.

For one embodiment of the invention, the customer's shipping address is stored on the payment processor server, and therefore the customer does not have to input or select a shipping address on web page 36 of the merchant website. However, alternatively, for one embodiment of the invention, the shipping address is selected or input by the customer at the merchant website. For example, the customer may select a shipping address from a list of addresses previously input at the merchant website, or alternatively, the customer may be prompted to input a shipping address at web page 36. Accordingly, for one embodiment of the invention, the merchant server 24 will communicate the customer's shipping address to the payment processor server 26 along with a variable indicating that the payment processor should process the transaction with the shipping address selected at the merchant website, and not a default shipping address stored by the payment processor. Additionally, prior to displaying the checkout web page 42, the merchant server 24 may calculate any shipping and handling fees, as well as any applicable taxes 38 for the transaction, based on the customer selected shipping address.

The first communication to the payment processor is begun as follows. At the payment processor, the transaction is initiated when the merchant server 24 sends or provides the transaction data (e.g., merchant ID, shopping cart ID, payment amount, additional fees, address, etc.) to the payment processor server 26. For one embodiment of the present invention, before the transaction data is communicated from the merchant server 24 to the payment processor server 26, it is digitally signed utilizing a public-private key encryption scheme 40. By digitally signing the transaction data before communicating it from the merchant server 24 to the payment processor server 26 in operation 44, the payment processor server 26 can authenticate the source of the data. For example, the payment processor server 26 can verify and confirm that no one has intercepted and modified the transaction data en route from the merchant server 24 to the payment processor server 26. Under the digital signature scheme, each merchant server 24 digitally signs the transaction data with its own private key before communicating the transaction data to the payment processor server 26. The payment processor server 26 utilizes the public key assigned by the merchant to verify that the digital signature matches that of the particular merchant server 24 from which the transaction data was received. Digitally signing the transaction data provides the payment processor server 26 with a method to authenticate the transaction data, but it does not prevent an interceptor from reading or monitoring the transaction data.

For one embodiment of the present invention, as an added security precaution for merchants, the transaction data is encrypted utilizing an asymmetric encryption scheme with public and private keys before digitally signing and communicating the data from the merchant server 24 to the payment processor server 26 at operation 44. Encrypting the transaction data prevents an interceptor from reading or monitoring the data. Under the encryption scheme, the payment processor provides each merchant with a public key of a public-private key pair. Each merchant server 24 utilizes the public key to encrypt the transaction data 40 prior to digitally signing and communicating the data to the payment processor server 26. After the transaction data is received at the payment processor server 26, the payment processor server 26 decrypts the transaction data with its private key, and then verifies the source of the transaction data with the public key of the merchant server 24 that sent the data. Consequently, the transaction data is securely communicated from the merchant server 24 to the payment processor server 26.

In an alternative embodiment, rather than using public-private key encryption, a secure communication channel is used to communicate the transaction data from the merchant server 24 to the payment processor server 26. Alternatively, a secure communication protocol is used to communicate the transaction data from the merchant server 24 to the payment processor server 26.

Once the payment processor server 26 has received, decrypted and authenticated the transaction data sent by the merchant server, the payment processor displays a payment web page 46 in the browser executing on the client 20. The payment web page 46 displays to the user the transaction data including a listing of the items selected for purchase, the price of each item, the shipping and handling charges, and any applicable taxes. In addition, the payment web page 46 prompts the customer to enter a username and password to verify the customer's identity and for purposes of determining whether the selected form of payment is available to the customer. For example, if the customer selects as a form of payment an account held with the payment processor, the customer must have previously established an account with the payment processor in order for the selected form of payment to be valid. If the customer does not have a previously established account, the customer might be presented with one or more web pages prompting the customer to establish an account with the payment processor. However, if the customer has already established an account, the customer will simply enter a username and password, and select a button or link 48 to submit the user credentials.

After receiving and successfully verifying the user credentials, the payment processor server 26 delivers to the client web browser 20 an order confirmation web page 50. For one embodiment of the invention, the order confirmation web page 50 displays transaction data including the selected form of payment, the exact amount to be charged for the transaction and the shipping address for the transaction. When the customer has confirmed that the displayed transaction data is accurate, the customer selects a button or link 52 on the order confirmation web page 50 to confirm the payment.

After the customer has confirmed the payment, the payment processor server 26 submits the payment request for processing and performs an operation 53 to generate a payment ID to identify payment data related to the payment. For example, payment data might include, amongst other things, the status of the payment (e.g., whether the payment is successful, unsuccessful, or still pending), the amount of the payment successfully processed, and the date on which the payment was successfully processed. Next, the payment processor server 26 communicates the payment ID as part of an HTML document to the merchant server 24 using the HTTPS post method, as indicated by reference numeral 54 in FIG. 2. Because the payment ID, instead of the payment data itself, is being communicated to the merchant server 24, there is virtually no opportunity for someone to intercept and edit the payment data. However, in alternative embodiments, the payment ID may be digitally signed to ensure its authenticity, and to provide further security, the payment ID may be encrypted. Furthermore, a protocol other than the HTTPS post method may be used to communicate the payment ID from the payment processor 26 to the merchant server 24.

When the merchant server 24 receives the payment ID, it will verify the authenticity 55 of the payment ID by using the public key of the payment processor server's public-private key pair. Furthermore, if the payment ID has been encrypted with the merchant server's 24 public key, the merchant server will decrypt the payment ID using its private key. At operation 56, the merchant server 24 generates a request for payment information. For one embodiment, the request is made by calling a function that is part of an application programming interface API 58. The request, which includes the payment ID to identify the particular transaction data that is being requested, is communicated to the payment processor server 26 at operation 60. In response to the request, the payment processor server 26 looks up the payment status and other payment information related to the payment ID, and returns 62 the payment data 64 to the merchant server 24.

The merchant server 24, after receiving the payment data, performs a business operation 66 to determine how to proceed based on the status of the payment. For example, as indicated by reference numeral 68 in FIG. 2, if the payment status indicates a successful payment, the merchant server 24 presents the customer with an order confirmation web page 68 confirming the successful payment with the customer.

Figure 3:
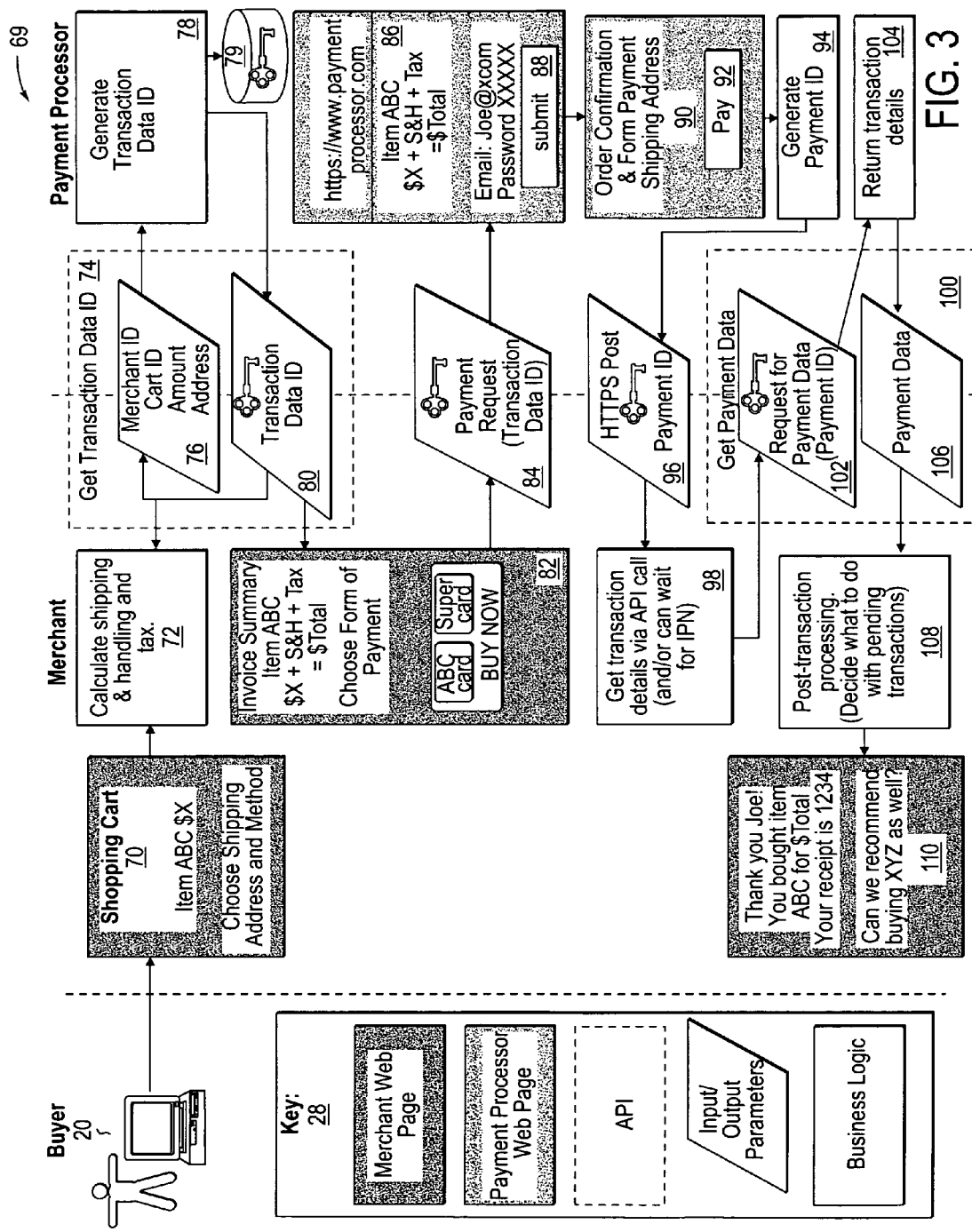
FIG. 3 illustrates a method of processing a transaction payment for an e-commerce transaction from the perspective of a user, for one embodiment of the present invention.

FIG. 3 is similar to FIG. 2, however FIG. 3 illustrates an alternative exemplary embodiment of a method 69 of processing a transaction payment for an e-commerce transaction from the perspective of a customer. In accordance with one embodiment of the present invention, a customer, or buyer, uses a web client 20 to browse a virtual store hosted on merchant server 24. Once the customer has selected a number of items for purchase, the customer is presented with a preliminary checkout web page 70. The preliminary checkout web page 70 displays the contents of the customer's virtual shopping cart, including a listing of the items selected for purchase by the customer, as well as the prices of each item. In addition, for one embodiment of the invention, the preliminary checkout web page 70 prompts the customer to select a shipping address and shipping method (e.g., overnight or two day air shipping) for the items. In an alternative embodiment, the payment processor server 26 provides a default shipping address for the transaction, and therefore the customer is not prompted to enter a shipping address at web page 70 of the merchant website. After the customer has entered a shipping address, and chosen a shipping method, the customer selects a web button or link to a checkout web page 82.

When the customer selects the link to the checkout web page 82, the merchant server 24 first performs a business operation 72 to calculate any additional charges, including shipping and handling charges as well as any applicable taxes. Next, the merchant server 24 performs an operation 74 to communicate the transaction data 76 to the payment processor server 26. The payment processor server 26 receives the transaction data 76 and performs an operation 78 to generate a transaction data ID to identify the transaction data 76. The payment processor server 26 communicates the transaction data ID to the merchant server 24, as indicated by reference numeral 80. Upon receiving the transaction data ID, the merchant server 24 displays the checkout web page 82 to the customer.

For one embodiment of the present invention, before the transaction data 76 is communicated from the merchant server 24 to the payment processor server 26, it is digitally signed utilizing a public-private key encryption scheme as described above with reference to FIG. 2. Under the digital signature scheme, each merchant provides the payment processor server 26 with a public key of a public-private key pair. The payment processor stores each merchant's public key in a key database 79. Each merchant server 24 digitally signs the transaction data 76 with its own private key before communicating the transaction data 76 to the payment processor server 26. The payment processor server 26 utilizes the public key assigned by the merchant to verify that the digital signature matches that of the particular merchant server 24 from which the transaction data 76 was received.

For one embodiment of the present invention, as an added security precaution, the transaction data 76 is encrypted utilizing an asymmetric encryption scheme as described above with reference to FIG. 2. Under the encryption scheme, the payment processor provides each merchant with a public key of a public-private key pair. Each merchant server 24 utilizes the public key to encrypt the transaction data 36 prior to digitally signing and communicating the data 36 to the payment processor server 26. After the transaction data 76 is received at the payment processor server 26, the payment processor server 26 decrypts the transaction data with its private key, and then verifies the source of the transaction data with the public key of the merchant server that sent the data 76. Consequently, the transaction data 76 is securely communicated from the merchant server 24 to the payment processor server 26.

In an alternative embodiment, rather than using public-private key encryption, a secure communication channel is used to communicate the transaction data from the merchant server 24 to the payment processor server 26. Alternatively, a secure communication protocol is used to communicate the transaction data from the merchant server 24 to the payment processor server 26.

Once the transaction data 76 is received at the payment processor server 26, the payment processor server 26 generates a unique transaction data ID to identify the transaction data 76, as illustrated by reference numeral 78. For one embodiment of the present invention, the transaction data ID is generated by performing a hash operation on the transaction data. In an alternative embodiment, a random number generator is used to generate the transaction data ID.

In FIG. 3, the transaction data 76 is shown to include a merchant ID, shopping cart ID, dollar amount and shipping address. However, it will be understood that the transaction data 76 could include any data related to the transaction that may be required to process the payment.

Once the payment processor has generated a unique transaction data ID 78, the payment processor communicates the transaction data ID 80 to the merchant server 24. In turn, the merchant server 24 displays the checkout web page 82 to the customer. When the customer has selected the payment processor as the payment method, the transaction data ID is communicated from the customer's client PC 20 to the payment processor server 26 in the form of a request

84 to process a payment. For one embodiment of the present invention, the request 84 to process the payment, including the transaction data ID, is part of an HTML document that is communicated to the payment processor server 26 using the HTTPS post method, as indicated by reference numeral 84 in FIG. 3. However, in alternative embodiments, a communication protocol other than HTTPS POST may be used. Because the transaction data ID, rather than the transaction data itself, is being communicated from the client 20 to the payment processor server 26, there is no opportunity to intercept and edit the transaction data 76.

Next, the payment processor server 26 receives the transaction data ID and delivers a payment web page 86 to the client web browser 20. The payment processor server 26 uses the transaction data ID to identify the previously received transaction data 76 associated with the particular transaction. For one embodiment of the invention, the payment web page 86 displays transaction data 76, including a listing of the items selected for purchase, the price of each item, the shipping and handling charges, and any applicable taxes. In addition, the payment web page 86 prompts the customer to enter a username and password to verify the customer's identity and for purposes of determining which forms of payment are available to the customer. For example, if the customer selects as a form of payment an account held with the payment processor, the customer must have previously established an account with the payment processor in order for the selected form of payment to be valid. If the customer does not have a previously established account, the customer might be presented with one or more web pages prompting the customer to establish an account with the payment processor. However, if the customer has already established an account, the customer will simply enter a username and password, and select a button or link 88 to submit the user credentials.

In response to receiving the user credentials, the payment processor server 26 delivers to the client web browser 20 an order confirmation web page 90. For one embodiment of the invention, the order confirmation web page 90 displays transaction data including the selected form of payment, the exact amount to be charged for the transaction and the shipping address for the transaction. For one embodiment of the invention, the shipping address that is displayed is selected by the customer at the merchant website, and communicated to the payment processor server 26. However, in an alternative embodiment, the shipping address is selected or input at the payment processor website, or a default shipping address stored by the payment processor is displayed.

For one embodiment of the invention, the customer may have the option of changing the form of payment. For example, the customer may be able to select a different credit card or bank account to use for the transaction. When the customer has confirmed that the displayed transaction data is accurate, the customer selects a button or link 92 on the order confirmation web page 90 to confirm the payment.

After the customer has confirmed the payment, the payment processor server 26 submits the payment request for processing and performs an operation 94 to generate a payment ID to identify payment data related to the payment. For example, payment data might include, amongst other things, the status of the payment (e.g., whether the payment is successful, or still pending), the amount of the payment successfully processed, and the date on which the payment was successfully processed. For one embodiment of the invention, if a selected form of payment (e.g., bank or credit card account) is not valid or fails, the customer is prompted to enter a different payment method.

Next, the payment processor server 26 communicates the payment ID as part of an HTML document to the merchant server 24 using the HTTPS post method, as indicated by reference numeral 96 in FIG. 2. Because the payment ID, instead of the payment data itself, is being communicated to the merchant server 24, there is virtually no opportunity for someone to intercept and edit the payment data. However, in alternative embodiments, the payment ID may be digitally signed to ensure its authenticity, and may be encrypted. Furthermore, a protocol other than the HTTPS post method may be used to communicate the payment ID from the payment processor 26 to the merchant server 24.

In addition to generating a payment ID to identify the payment data, after the customer has confirmed the payment, the payment processor server 26 generates an instant payment notification (IPN) and communicates the IPN to the merchant server 24. In one embodiment, the payment processor server 26 also makes funds immediately available to the merchant in the amount of the payment. The IPN provides the merchant server 26 with real-time notification and confirmation of payments made by the customer. In addition, an IPN might provide the merchant server with additional data relating to pending, cancelled, or failed transactions. For example, a separate IPN might be generated by the payment processor server 26 and communicated to the merchant server 24 when the status of a payment changes.

Alternatively, the merchant server 24 can request payment data at any time by simply communicating a request 102 for payment data, including the payment ID to identify the transaction to which the payment data relates. As illustrated in FIG. 3, at reference numeral 100 the merchant server 24 performs a business operation to generate 98 a request for payment data. Next, the merchant server 24 performs an operation 102 to communicate a request for payment data, including the payment ID, to the payment processor server 26. Upon receiving the request for payment data, the payment processor server 26 performs an operation 104 to retrieve the payment data, identified by the payment data ID, and communicates the payment data to the merchant server 24, as indicated by reference numeral 106.

For one embodiment of the invention, prior to sending the payment data to the merchant server 24, the payment data is digitally signed and encrypted using the digital signature and encryption scheme described above. For example, the payment processor server 26 encrypts the payment data using the public key assigned to the payment processor server 26 by the merchant server 24. After encrypting the payment data, the payment processor server 26 digitally signs the encrypted payment data with the payment processor server's private key. When received at the merchant server 24, the payment data is authenticated using the public key assigned by the payment processor and then decrypted using the merchant server's private key. In an alternative embodiment the payment data is communicated over a secure communication channel, or using a secure communications protocol.

The merchant server 24, after receiving the payment data, performs a business operation 108 to determine how to proceed based on the status of the payment. For example, as indicated by reference numeral 110 in FIG. 3, if the payment status indicates a successful payment, the merchant server 24 presents the customer with an order confirmation web page 110 confirming the successful payment with the customer.

Figure 4A:
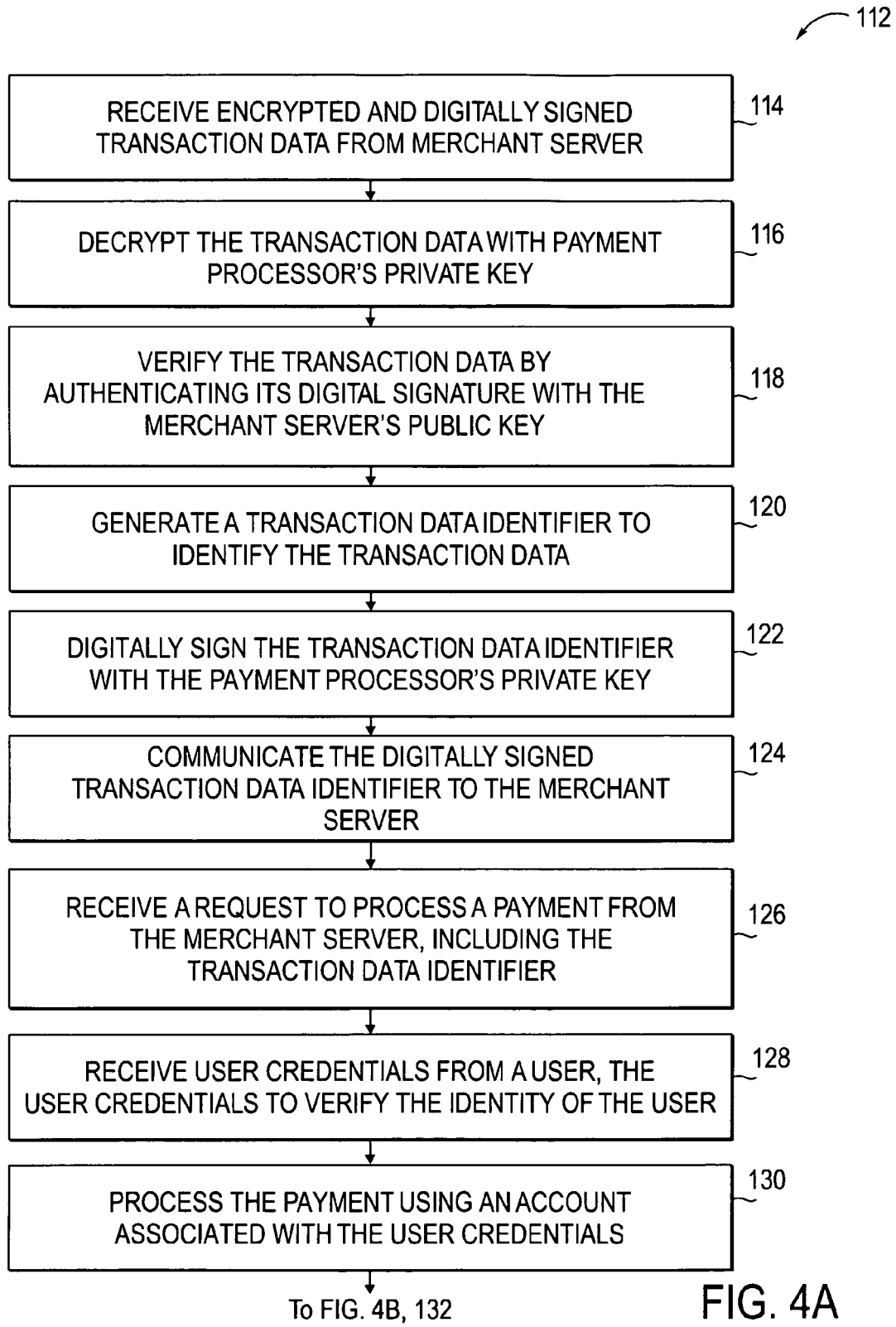
FIGS. 4A and 4B illustrate a flowchart for one method of processing a transaction payment for an e-commerce transaction, for one embodiment of the present invention.
Figure 4B:
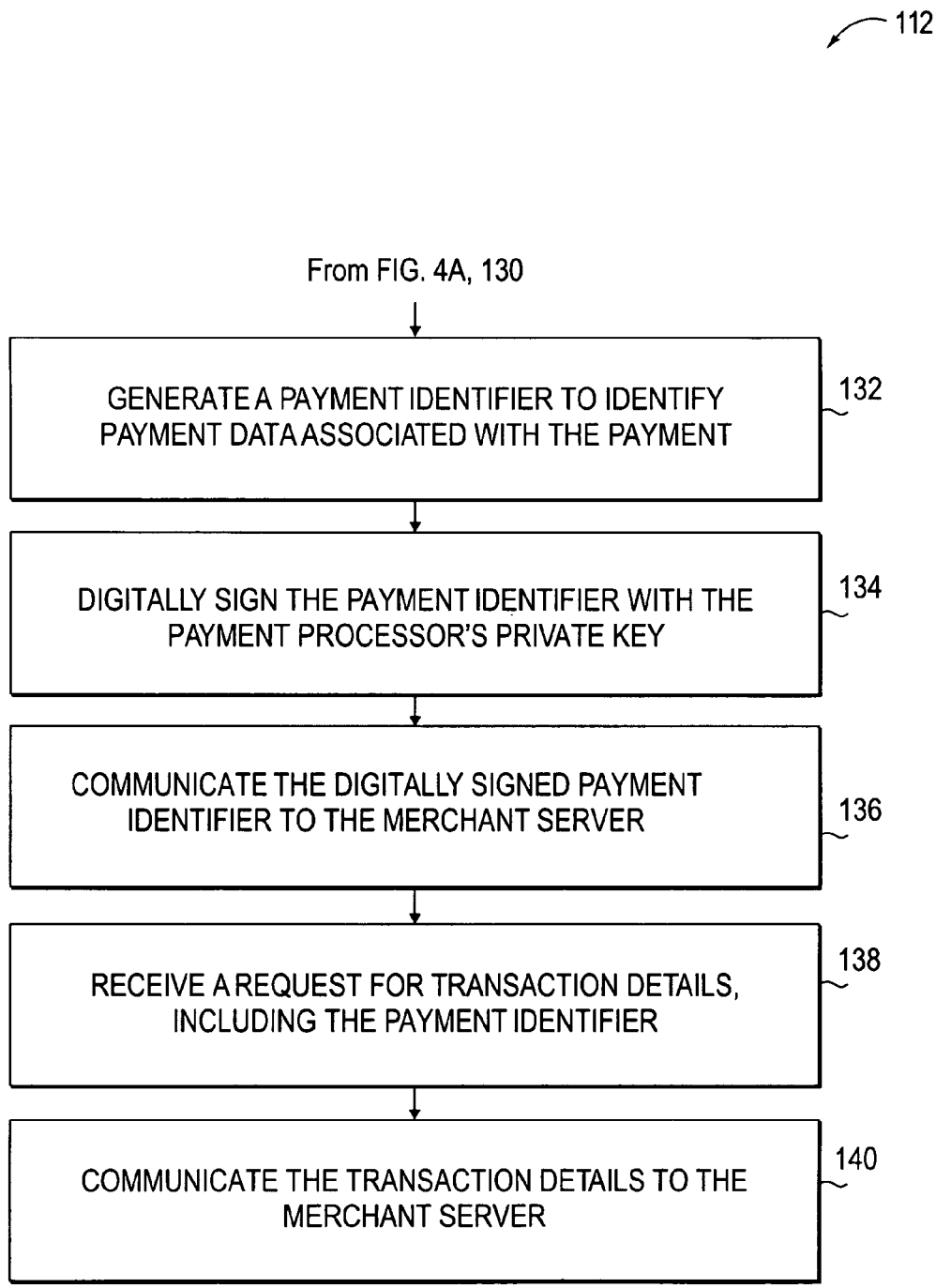

FIGS. 4A and 4B illustrate a flowchart for one method 112 of processing a transaction payment for an e-commerce transaction, consistent with one embodiment of the present invention. At operation 114, the payment processor server 26 receives encrypted and digitally signed transaction data 36 from the merchant server 24. For one embodiment, the transaction data 36 is encrypted with a payment processor's public key and digitally signed with a merchant server's private key at the merchant server 24, before it is sent. In alternative embodiments, the transaction data 36 is communicated over a secure communications channel, or via a secure communications protocol. At operation 116, the payment processor server 26 decrypts the transaction data with the payment processor's private key. Next, the payment processor verifies the authenticity of the transaction data by authenticating its digital signature using the merchant server's public key at operation 118.

At operation 120, the payment processor server 26 generates a transaction data ID to identify the transaction data received in operation 114. Next, at operation 122, the payment processor server 26 digitally signs the transaction data ID with the payment processor's private key. At operation 124, the payment processor communicates the digitally signed transaction data ID to the merchant server 24.

At operation 126, the payment processor server 26 receives a request 44 to process a payment from merchant server 24. The request 44 to process the payment, which includes the transaction data ID, might be communicated using the HTTPS post method. For one embodiment of the invention, at operation 126, the payment processor server 26 sends a web page to the client 20 that prompts the customer to enter user credentials including a username and password. The customer's user credentials are received from the client 20 at operation 128. For one embodiment of the present invention, the user credentials are communicated to the payment processor server 26 via the HTTPS post method. At operation 130, the payment is processed using an account associated with the user credentials.

At operation 132 of FIG. 4B, the payment processor server 26 generates a payment ID to identify payment data associated with the payment. Next, at operation 134, the payment processor server 26 digitally signs the payment data ID with the payment processor server's private key. At operation 136, the payment processor server communicates the digitally signed payment ID to the merchant server 24. For one embodiment of the present invention, the payment ID is communicated to the merchant server 24 as part of an HTML document using the HTTPS post method. However, in alternative embodiments, other communication protocols are used.

At operation 138, the payment processor server 26 receives a request for payment data 60 from the merchant server 24. The request for payment data 60 includes the payment ID, generated at operation 86, to identify the payment data that is being requested. In response to the request for payment data 60, at operation 140 the payment processor server 26 communicates the payment data 62 to the merchant server 24. For one embodiment of the invention, the payment processor server 26 encrypts the payment data with a public key of a public-private key pair before communicating the payment data to the merchant server 24. When the payment data is received at the merchant server 24, the merchant server 24 decrypts the payment data with the private key of the public-private key pair. In alternative embodiments, the payment data is communicated over a secure communication channel or via a secure communication protocol.

One of the advantages of the method described with respect to the description of FIGS. 4A and 4B is that the transaction data and payment data are referenced only by transaction data ID and payment ID, respectively, when using communication protocols such as the HTTP or HTTPS post methods. Consequently, there is little opportunity for someone to intercept and misuse the transaction data and/or payment data. Another advantage of the present invention is the ability to implement the method as a standard set of application programming interface (API) function calls to be distributed to merchants as part of a software development kit, consequently, cutting down on the development time required for a merchant to integrate systems with the payment processor.

Figure 5:
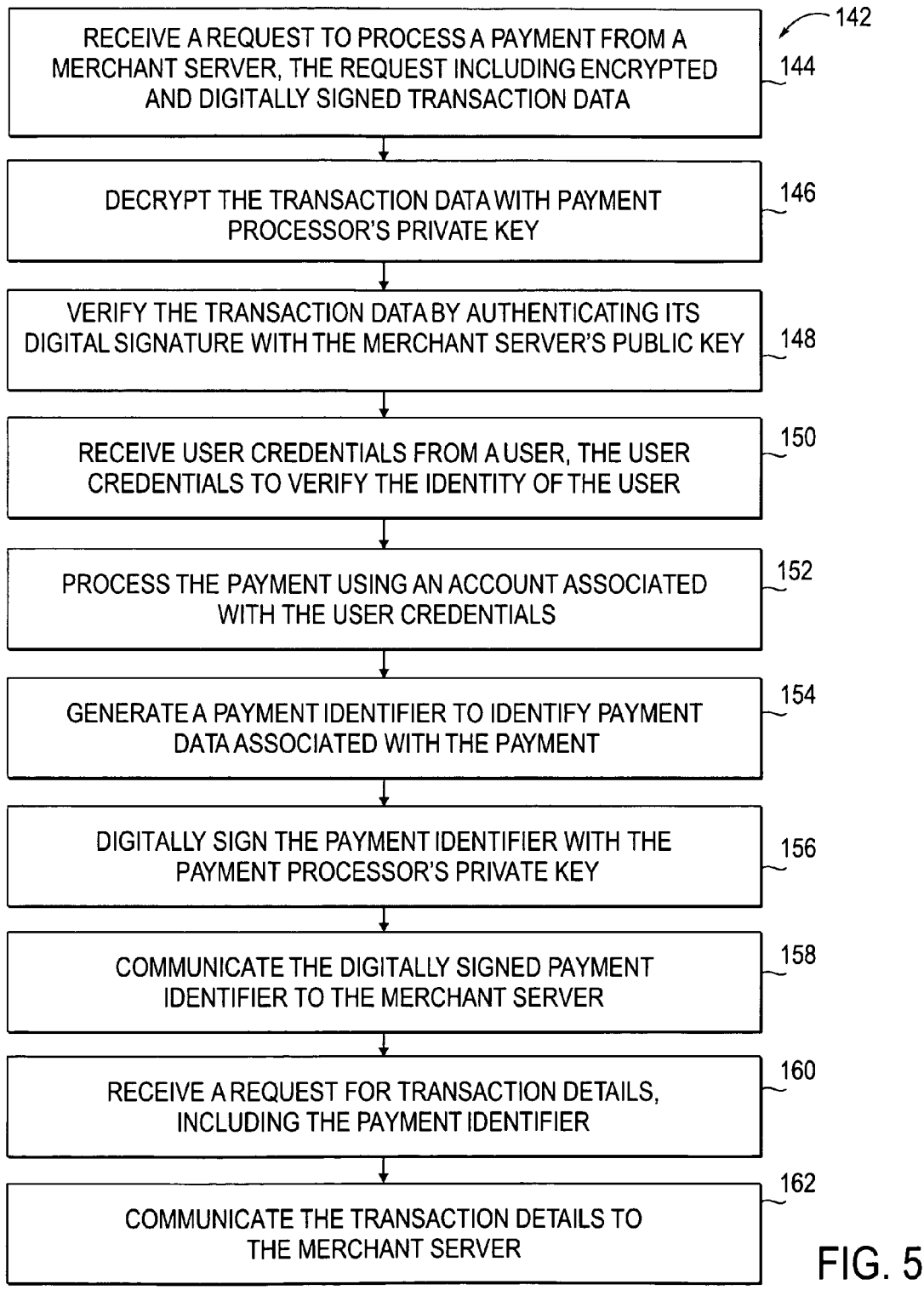
FIG. 5 illustrates a flowchart for one method of processing a transaction payment for an e-commerce transaction, for one embodiment of the present invention; and, FIG. 6 is a diagrammatic representation of a machine in the exemplary form of a computer system within which a set of instructions, for causing the machine to perform any one of the methodologies discussed above, may be executed.

FIG. 5 illustrates a flowchart for one method 142 of processing a transaction payment for an e-commerce transaction, consistent with one embodiment of the present invention. At operation 144, the payment processor server 26 receives a request, including encrypted and digitally signed transaction data, to process a payment from a merchant server 24. For one embodiment, the transaction data 36 has been encrypted with a payment processor's public key and digitally signed with a merchant server's private key at the merchant server 24, prior to being received. In alternative embodiments, the transaction data 36 is communicated over a secure communications channel, or via a secure communications protocol. At operation 146, the payment processor server 26 decrypts the transaction data with the payment processor's private key. Next, the payment processor verifies the authenticity of the transaction data by authenticating its digital signature using the merchant server's public key at operation 148.

At operation 150, in response to prompting a user to enter user credentials, the payment processor server 26 receives user credentials from the user. The payment processor server 26 verifies the identity of the user using the user credentials of the user requesting payment. Assuming the verification is successful, at operation 152, the payment processor server 26 processes the payment using an account associated with the user credentials entered by the user.

At operation 154, the payment processor server 26 generates a payment ID to identify payment data associated with the payment. At operation 156, the payment processor 26 digitally signs the payment ID using the payment processor's private key. Once the payment ID is digitally signed, the payment processor server 26 communicates the digitally signed payment ID to the merchant server 24 at operation 158.

At operation 160, the payment processor server 26 receives a request for transaction details. The request includes the payment ID to identify payment data associated with the transaction payment. In response to receiving the request, the payment processor server communicates transaction details, including payment status, to the merchant server at operation 162.

Figure 6:
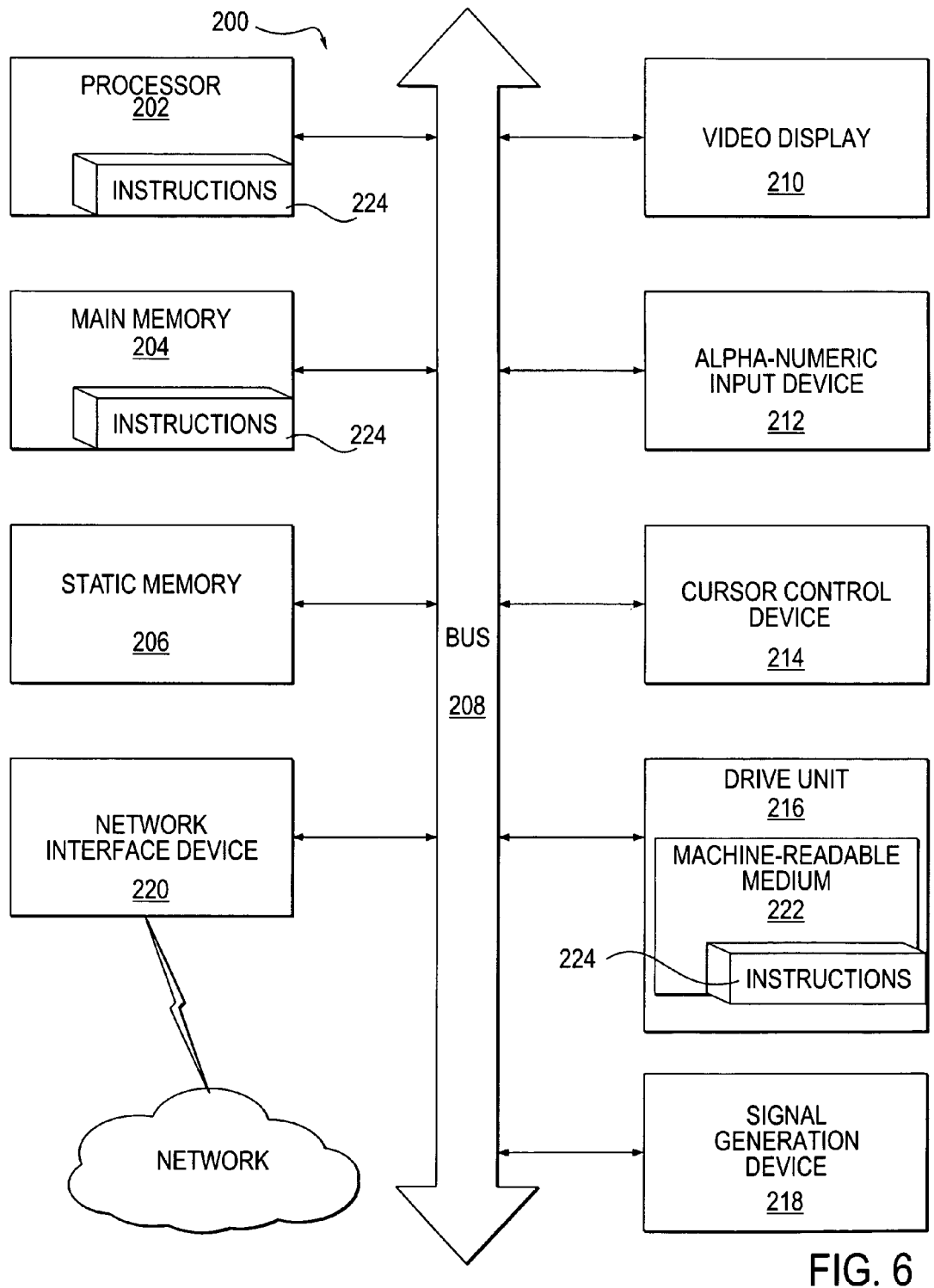

FIG. 6 shows a diagrammatic representation of a machine in the exemplary form of a computer system 200 within which a set of instructions, for causing the machine to perform any one of the methodologies discussed above, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or cathode ray tube (CRT)). The computer system 200 also includes an alphanumeric input device 212 (e.g. a keyboard), a cursor control device 214 (e.g. a mouse) a disk drive unit 216, a signal generation device 218 (e.g. a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to; solid-state memories, optical and magnetic disks, and carriers wave signals.

Thus, a computer-implemented method and system to process a payment for an e-commerce transaction are described. It will be evident that various modifications and changes may be made to these embodiments without departing from the broader spirit and scope of the invention. Accordingly, the specification and drawings are to be regarded in an illustrative rather than a restrictive sense. For example, the invention may also be applied in a peer-to-peer computing environment.

What is claimed is:

1. A computer-implemented method to facilitate processing a payment for an online transaction, the method comprising:
    responsive to receiving transaction data, digitally signed by the merchant, from a merchant server over a secure communication channel generating by a payment processor, based on the transaction data, a transaction data identifier;
    communicating the transaction data identifier from the payment processor to the merchant server over the secure communication channel;
    receiving by the payment processor from the merchant server a request to process a payment, the request being digitally signed by the merchant and including the transaction data identifier;
    responsive to receiving the request, requesting by the payment processor user credentials from a user;
    responsive to receiving the user credentials from the user, verifying, by the payment processor, the user credentials to establish an identity of the user;
    processing a payment using an account associated with the user credentials, by the payment processor sending the payment to the merchant;
    generating a secure payment identifier to identify payment data associated with the payment, the payment data including a payment status;
    communicating the secure payment identifier, digitally signed by the payment processor, to the merchant server; and
    receiving, by the payment processor, a request for payment data, digitally signed by the merchant, over the secure communication channel from the merchant server, the request including the secure payment identifier.

2. The computer-implemented method of claim 1, further comprising:
    responsive to receiving a request for payment data over the secure communication channel, the request including the payment identifier, communicating the payment data to the merchant server over the secure communication channel.

3. The computer-implemented method of claim 1, wherein the request to process a payment includes a user selected form of payment.

4. The computer-implemented method of claim 1, wherein the request to process a payment is received utilizing the hypertext transfer protocol post method.

5. The computer-implemented method of claim 1, wherein the function includes performing a secure hash operation on the transaction data to generate the transaction data identifier.

6. The computer-implemented method of claim 2, wherein the communicating of the payment identifier to the merchant server includes posting the payment identifier utilizing the hypertext transfer protocol post method.

7. A system to facilitate processing a payment for an online transaction, the system comprising:
    a payment processor to generate, based on a function of the transaction data, a transaction data identifier to identify transaction data, digitally signed by a merchant, received from a merchant server over a secure communication channel; and
    at least one server configured to:
        communicate the transaction data identifier from the payment processor to the merchant server over the secure communication channel;
        receive a request, digitally signed by the merchant, to process a payment from the merchant server, the request to process the payment including the transaction data identifier;
        responsive to receiving the request to process the payment, request user credentials from a user;
        receive and verify, at the payment processor, the user credentials from the user;
        process a payment using an account associated with the user credentials, the process including sending the payment from the payment processor to the merchant;
        generate a secure payment identifier to identify payment data associated with the payment, the payment data including a payment status;
        communicate the secure (payment identifier, digitally signed by the payment processor, to the merchant server; and
        receive a request, digitally signed by the merchant, for payment data over the secure communication channel from the merchant server, the request including the secure payment identifier.

8. The system of claim 7, wherein the at least e server is further configured to:
    communicate the payment data to the merchant server over the secure communication channel.

9. The system of claim 7, wherein the function includes performing a secure hash operation on the transaction data.

10. The system of claim 8, wherein the transaction data includes a merchant identifier, a shopping cart identifier, a payment amount, and an address.

11. The system of claim 8, wherein the request to process a payment includes a user selected form of payment.

12. The system of claim 8, wherein the payment data includes payment status information.

13. The system of claim 8, wherein the request to process a payment is received utilizing the hypertext transfer protocol post method.

14. The system of claim 8, wherein the payment identifier is communicated to the merchant server with the hypertext transfer protocol post method.

15. A system to facilitate processing a payment for an online transaction, the system comprising:
   means for generating a transaction data identifier, digitally signed by the merchant, to identify the transaction data, by a payment processor, based on a function of transaction data, responsive to receiving the transaction data from a merchant server over a secure communication channel;
   means for communicating the transaction data identifier from the payment processor to the merchant server over the secure communication channel;
   means for receiving by the payment processor from the merchant server a request to process a payment, the request being digitally signed by the merchant and including the transaction data identifier;
   means for requesting user credentials from a user, responsive to receiving the request to process the payment from the merchant server;
   means, at the payment processor, for verifying the user credentials to establish an identity of the user, responsive to receiving user credentials from the user;
   means for processing a payment using an account associated with the user credentials, the means for processing a payment including means for the payment processor to send the payment to the merchant; and
   means for generating a secure payment identifier to identify payment data associated with the payment, the payment data including a payment status;
   means for communicating the secure payment identifier, digitally signed b the payment processor, to the merchant server; and
   means for receiving, by the e payment processor, a request, digitally signed by the merchant, for payment data over the secure communication channel from the merchant server, the request including the secure payment identifier.

16. The system of claim 15, said system to facilitate processing a payment further comprising:
   responsive to receiving a request for payment data over the secure communication channel, the request including the payment identifier, means for communicating the payment data to the merchant server over the secure communication channel.

\* \* \* \* \*